United States Patent [19]

Foreman

[11] 4,149,030
[45] Apr. 10, 1979

[54] MULTI-DROP COMMUNICATIONS DEVICE
[75] Inventor: Donald S. Foreman, Fridley, Minn.
[73] Assignee: Honeywell Inc., Minneapolis, Minn.
[21] Appl. No.: 807,467
[22] Filed: Jun. 17, 1977
[51] Int. Cl.² .................................................. H04L 5/14
[52] U.S. Cl. ............................... 178/59; 178/66 R; 179/2 DP
[58] Field of Search ............... 179/2 DP, 16 F, 1 C, 179/2 C; 325/38 B; 178/58, 59, 60, 66 R, 66 A, 68; 333/6, 8, 16, 79

[56] References Cited

U.S. PATENT DOCUMENTS

| | | | |
|---|---|---|---|
| 3,754,196 | 8/1973 | Collins | 333/8 |
| 3,872,408 | 3/1975 | Reilly | 333/8 |
| 3,899,637 | 8/1975 | Willard et al. | 178/59 |
| 3,906,167 | 9/1975 | Baker | 179/16 F |
| 3,983,324 | 9/1976 | Lacher | 178/59 |
| 4,056,689 | 11/1977 | Freimanis | 179/16 F |

*Primary Examiner*—Kathleen H. Claffy
*Assistant Examiner*—Gerald L. Brigance
*Attorney, Agent, or Firm*—Alfred N. Feldman

[57] ABSTRACT

A digital data modem arrangement is disclosed for use in a multi-drop communication system using either telephone lines or a pair of conductors. The communications device connected to a communications channel is readily adapted to a voice grade telephone line or a pair of continuous conductors. The disclosed digital data modem is capable of operating with either type of communications channel without the need of bridging amplifiers, and without substantially loading the impedance of the communications channel.

3 Claims, 8 Drawing Figures

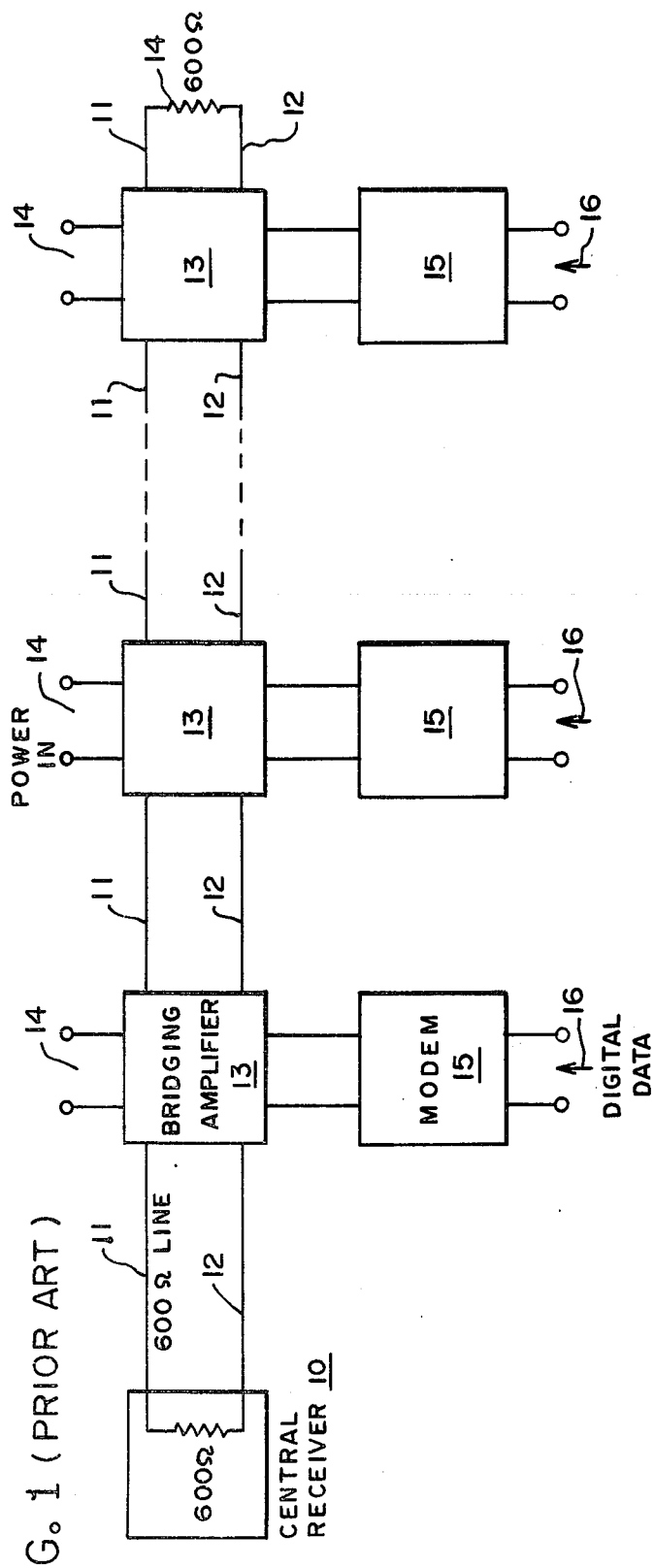
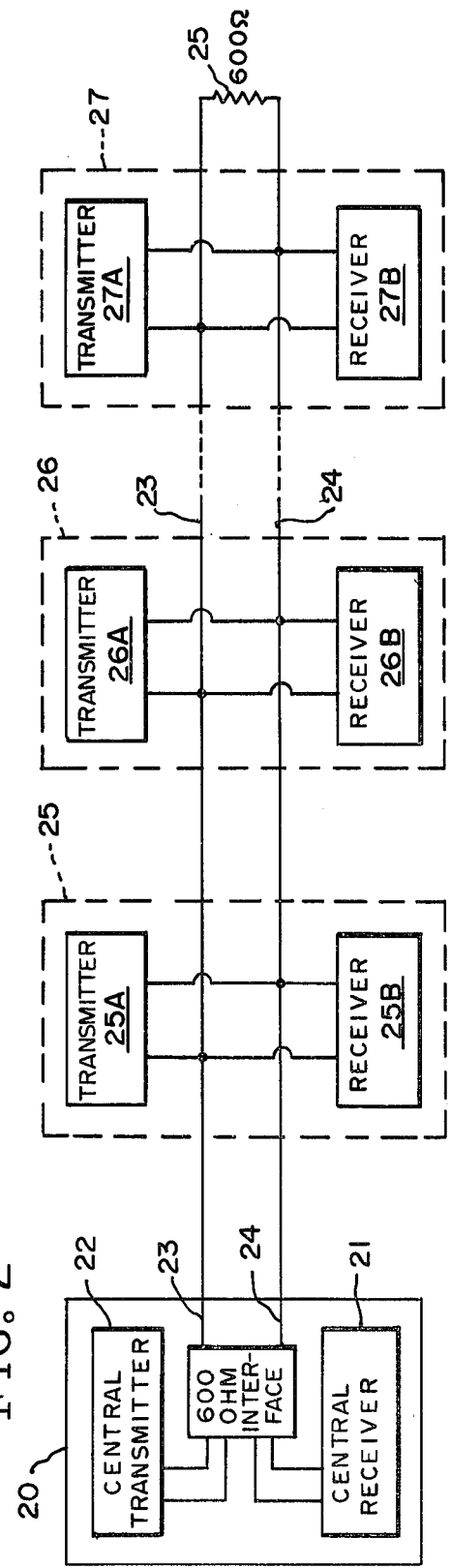
FIG. 1 (PRIOR ART)
FIG. 2

MULTI-DROP COMMUNICATIONS DEVICE

BACKGROUND OF THE INVENTION

Multi-drop communications devices are extensively used in various types of communications systems. One such type of system in common usage today is for vehicle traffic control. A number of individual locations or intersections are controlled either locally or remotely from a central control or computer. In many of these systems the interlinking of the communications equipment is by way of a type of modem that is referred to as a frequency-shift-keyed asynchronous modem which is designed to be connected to a 600 ohm voice-grade telephone type line. Where multi-point or multi-drop operations are required, a bridging amplifier is used at each interconnection or each drop. Since these systems utilize telephone lines, the lines are normally rented from the local telephone utility and there is an initial charge and a recurring charge for each of the interconnections or drops used.

Because of the recurring charges, it is sometimes more economical, in terms of total cost over a number of years, to install user-owned dedicated cable. The dedicated cable can be a pair of continuous conductors that interlink the various locations or intersections in a vehicle traffic control system. With dedicated cables, if a conventional modem as described herein is used, a means must be provided at each drop to interface the modem with the cable. If the modems are simply connected to the wire, the impedance of each of the modems causes an impedance discontinuity and results in unacceptable attenuation and reflections in the line. This is because a transmission line must be driven by, and terminated in, its characteristic impedance in order to work properly. Anywhere an impedance discontinuity exists, some of the signal power incident upon the discontinuity is reflected back up the line and is dissipated in the load causing the discontinuity, leaving only the remainder of the energy to propagate further. The power attenuation results in reduced signal levels at distant stations, and the reflections from distant stations, being replicas of earlier signals, cause distortion of the incident signal.

In order to avoid these problems, the conductors are normally connected to bridging amplifiers which then interconnect to the modems that are used at each multi-drop location. This type of an arrangement has some very distinct disadvantages. One disadvantage is the cost of providing a bridging amplifier at each multi-drop location. Secondly, and possibly one of the major disadvantages of this type of circuit arrangement, is that each of the bridging amplifiers must be powered locally. In the case of the loss of electrical power to the bridging amplifier, the bridging amplifier becomes ineffective and all of the multi-drops along the system downstream from that point are cut off to the central transmitter or receiver. This loss of control can be very serious.

SUMMARY OF THE INVENTION

The present invention is directed to the idea of driving either a conventional voice-grade telephone line or a pair of conductors with substantially the same equipment. The driving device is a multi-drop communications device that drives the line with a high impedance current drive circuit as opposed to the conventional matched impedance voltage drive arrangement that is typical in multi-drop communications systems. In the present invention the novel circuit can be adapted to a voice-grade telephone line of the 600 ohm impedance type merely by placing a 600 ohm resistor across the device. Otherwise, the novel device is used to drive a pair of conductors directly.

The multi-drop communications device of the present invention is a circuit which causes a current to flow in whatever load is presented to it, and which is proportional to the voltage driving the circuit. That is, the current output of the novel device equals a constant times the voltage input, and is independent of the load impedance. The voltage in the load due to the driving circuit will then be equal to the current out times the impedance of the load. This is in turn equal to the constant of proportionality times the voltage input times the impedance of the load. If the circuit is designed to make the constant of proportionality the reciprocal of the line impedance, then for the impedance of the load equal to 600 ohms, the voltage of the load equals the voltage input divided by 600 times 600 which then equals the voltage in. The result is that the voltage of the load then equals the voltage input.

Because the load current due to the drive circuit is determined only by the input voltage, changes in the load voltage due to other influences, like other similar circuits on the line, cause no corresponding current change in the drive circuit. In particular, if the voltage input equals zero, then the current output equals zero, regardless of any voltage that may be present on the line.

The presence of such a circuit on the line therefore causes no impedance discontinuity in the line, because no current flows through it except in response to the voltage input. At the same time, however, applying a voltage input will impress a voltage on the line which is equal to the voltage that would be impressed on the line by a conventional matched-impedance (600 ohm) voltage source. Therefore, these circuits may be connected anywhere on the line, and inject signals into the line, without loading signals from elsewhere on the line and without creating an impedance discontinuity in the line which would cause reflections of signals that are propagated down the line. Further, because line continuity is maintained, loss of power at any of the multi-drop locations to the circuit does not disrupt the communications from the other circuits down the line. Further, connecting a single 600 ohm resistor across the two-wire output of the circuit makes it electrically the same as a standard type modem, thereby enabling it to be used with standard types of 600 ohm drops.

Simply stated, by driving a conventional communications channel with high impedance current drive devices, the devices can be connected at any location along the communications channel without causing disruptions, discontinuities, or reflected signals that interfere with the use of the communications channel itself. If the current drive device is terminated in a 600 ohm resistance, said drive device would be compatible with a 600 ohm voice-grade telephone line.

BRIEF DESCRIPTION OF THE DRAWINGS

FIG. 1 is a diagram of a prior art system;

FIG. 2 is a schematic representation of a two-wire, half-duplex system;

DESCRIPTION OF THE PREFERRED EMBODIMENTS

Figure 3:
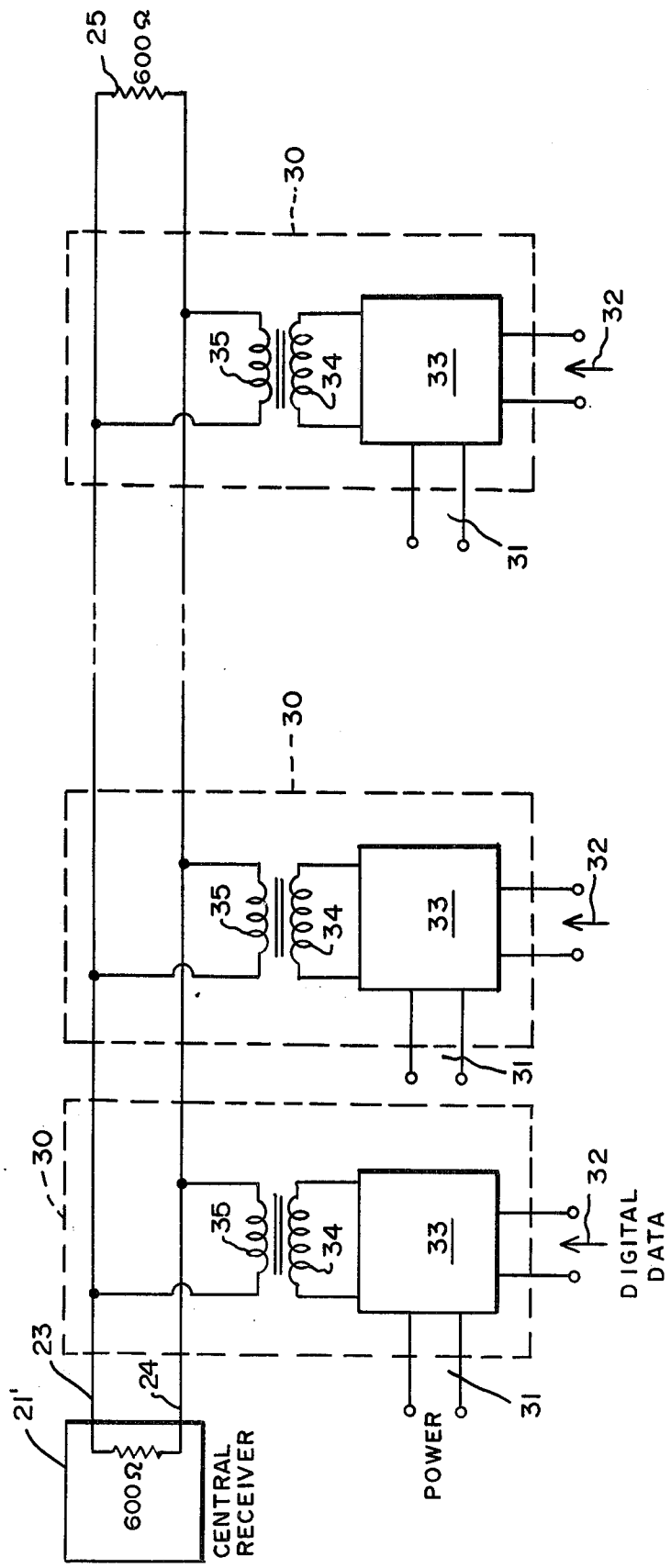
FIG. 3 is a schematic diagram of the in-bound half of a four-wire, full-duplex system.

In FIG. 1 part of a prior art type of system is disclosed. A central receiver 10 is provided and which is connected to a voice-grade telephone channel disclosed as conductors 11 and 12. The voice-grade telephone channel is normally a 600 ohm line and the central receiver 10 has been shown as presenting a 600 ohm impedance to the line. The conductors 11 and 12 connect to a series of bridging amplifiers 13 that are finally connected by the conductors 11 and 12 to a terminating resistance 14 which is also a matching 600 ohm. Each of the bridging amplifiers 13 has power input terminals 14 which are connected to conventional sources of energy, such as a local source of 60 hertz, 120 volt power. Each of the bridging amplifiers 13 is further connected by a pair of conductors to modems 15, which each have digital data inputs 16.

In this prior art type system, the bridging amplifiers 13 are powered by the power in at 14 and are of such an impedance to properly match the modems 15 to the 600 ohm line. Each of the modems 15 is capable of receiving digital data from an individual location or intersection, and which data is transmitted to the central receiver 10. It is apparent that if power is lost at any of the bridging amplifiers 13, that a discontinuity occurs that disables the downstream portion of the system.

FIG. 2 is a highly simplified diagram of the present invention which utilizes a number of transmitters and receivers that do not require bridging amplifiers. These elements will be described in more detail, particularly with reference to the circuitry of FIGS. 6, 7 and 8. In FIG. 2 a central station 20 is disclosed having a central receiver 21 and a central transmitter 22. In the present case the central receiver 21 and central transmitter 22 are connected to a 600 ohm interface that is used in such systems as traffic control systems.

The central station 20 is connected by a pair of ordinary conductors 23 and 24 to an end terminating resistor 25, which is a 600 ohm resistance. The conductors 23 and 24 are a pair of conventional conductors and form one type of communications channel between the central station transmitter 22 and the receiver 21, and a plurality of remote station means. The remote station means are disclosed as made of a group of individual transmitters 25A, 26A and 27A while the receivers are shown as individual receiving means 25B, 26B and 27B. Each of the transmitters and receivers 25A and B make up a complete data transmission arrangement for the remote station 25 that is capable of both sending and receiving instructions for a traffic control system or similar type system under the direction of the central station 20. It will be noted that each of the transmitters and receivers 25A, B, 26A, B, and 27A and B are connected to the pair of conductors 23 and 24 merely by conventional conductors and do not require any form of bridging amplifiers. The arrangement disclosed in FIG. 2 can be considered as a two-wire, half-duplex type system. With this arrangement, only one transmitter may be "on" at a time, and when any one of the transmitters is active, all of the receivers are capable of responding to it. All of the inbound and outbound communications between the various stations must be alternate. Since the data transmitted is in digital form, each of the elements is coded with an identification code, the necessary commands and the necessary check bits for the operation of the system.

In FIG. 3 there is disclosed half of a four-wire type, full-duplex system in which only a central receiver 21' is disclosed along with a pair of conductors 23 and 24. Once again the central receiver 21' is designed to have a 600 ohm impedance and the conductors 23 and 24 are again terminated by a resistance 25 that is 600 ohms to match the system.

Connected to the conductors 23 and 24 are a group of digital data modem means or multi-drop communications devices 30 that are disclosed as enclosed in the dashed box. The digital data modem means 30 includes input power at 31 and digital data input at 32. The digital data modem means 30 further includes a circuit 33 that will be disclosed in more detail in connection with FIGS. 6, 7 and 8. The circuit 33 is a device which produces an alternating current output whose frequency at any instant is one of two pre-ordained frequencies, depending upon which of two pre-ordained voltage ranges the instantaneous input voltage is in, one range having been designated as representing a digital "1", and the other range representing a digital "0". Circuits which convert a two-valued input voltage to a set of output frequencies are referred to as modems. The output of the modem 33 is the primary winding 34 of an isolation transformer that has a secondary 35 that is connected across the conductors 23 and 24. The primary 34 of the transformer is driven by a current control means in response to a frequency that in turn is responsive to the digital data 32 inputted into the model 33. The transformer is nonessential to the concept, except the transformer in FIG. 6. Transformers are commonly used to block static direct current and low-frequency (60 hertz) alternating current from the equipment, but the transformer contributes nothing to the basic communications process. The only constraint on the transformer is that it be "good" enough to present a high impedance on the secondary if there is a high impedance on the primary, in the frequency range of interest.

It will be noted that any convenient number of remote devices 30 are connectable across the conductors 23 and 24, and three have been shown by way of example. It will be understood that since each of the digital data modem means 30 injects current into the linen rather than impressing voltage across it, that the criteria set out in the Background of the Invention is met wherein there is little or not loading of the communications channel. The loss of power at 31 to any one of the digital modem means 30 merely disables that particular digital data modem means, but has no other effect on the communications channel. Since the digital data modem means 30 does not load the communications channel made up of the conductor 23 and 24, the loss of power to any of the digital data modem means 30 merely leaves the system in the state as if that modem means were not present and does not change the continuity of the communications channel.

Figure 4:
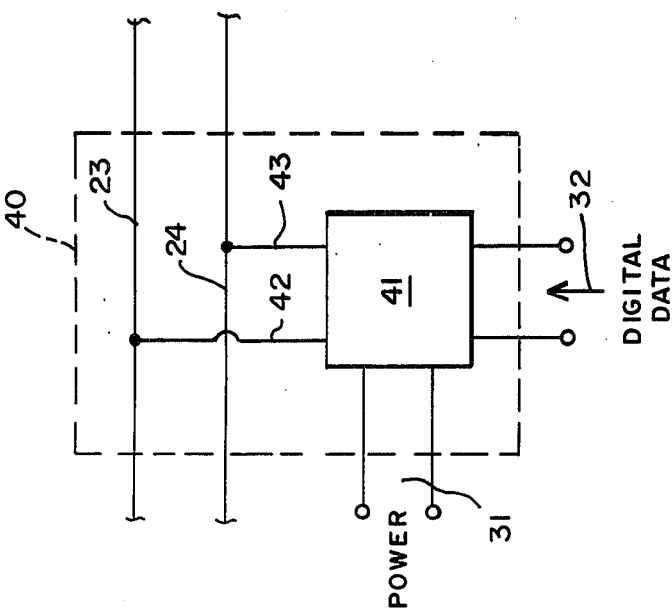
FIG. 4 is a block diagram disclosure of a digital data modem means according to the present invention.

In FIG. 4 an additional type of digital data modem means 40 is disclosed connected across the conductors 23 and 24. In this particular digital data modem means the input digital data 32 is again supplied along with power 31, but a circuit means 41 is disclosed which is connected directly by conductors 42 and 43 to the conductors 23 and 24. The circuit means 41 has a current drive or current control means that can be directly connected to the communications channel without the need of a coupling transformer. This type of device has been disclosed in connection with FIG. 8.

Figure 5:
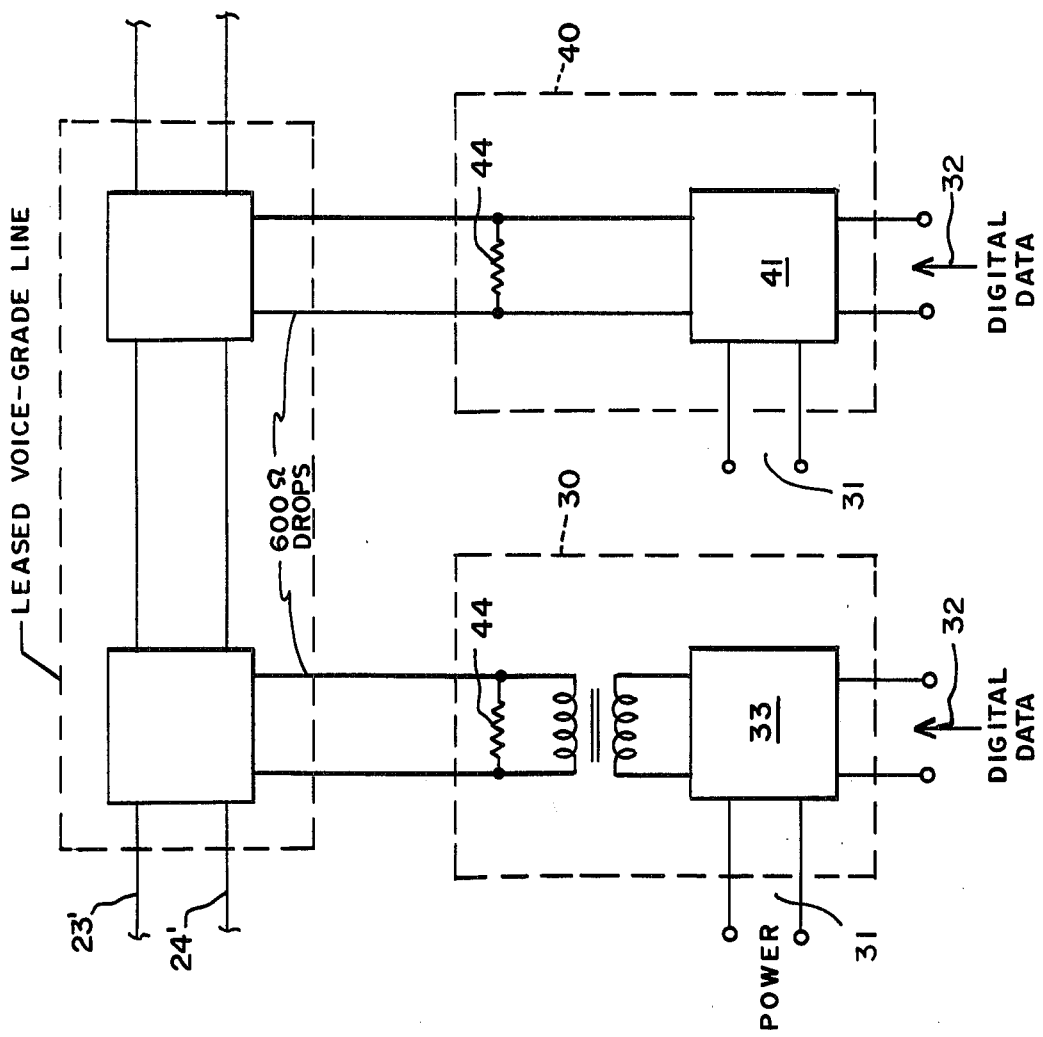
FIG. 5 is a block diagram disclosure of a pair of digital data modem means connected to a 600 ohm telephone line.

In FIG. 5, the digital data modem means 30 and 40 have been disclosed as connected to a 600 ohm voice-grade type telephone line. It will be noted that the only change in the digital data modem means 30 and 40 is the addition of a 600 ohm resistor 44 across the output of each of the circuits 33 and 41. The addition of the 600 ohm resistors 44 make the output of each of the digital data modem means 30 and 40 appear to be a 600 ohm load, as is the case when a 600 ohm line is used in a more conventional system. It can thus be seen that with a 600 ohm telephone grade line or communications channel, all that is needed is the addition of a simple resistance to use the digital data modem means of the present invention.

Figure 6:
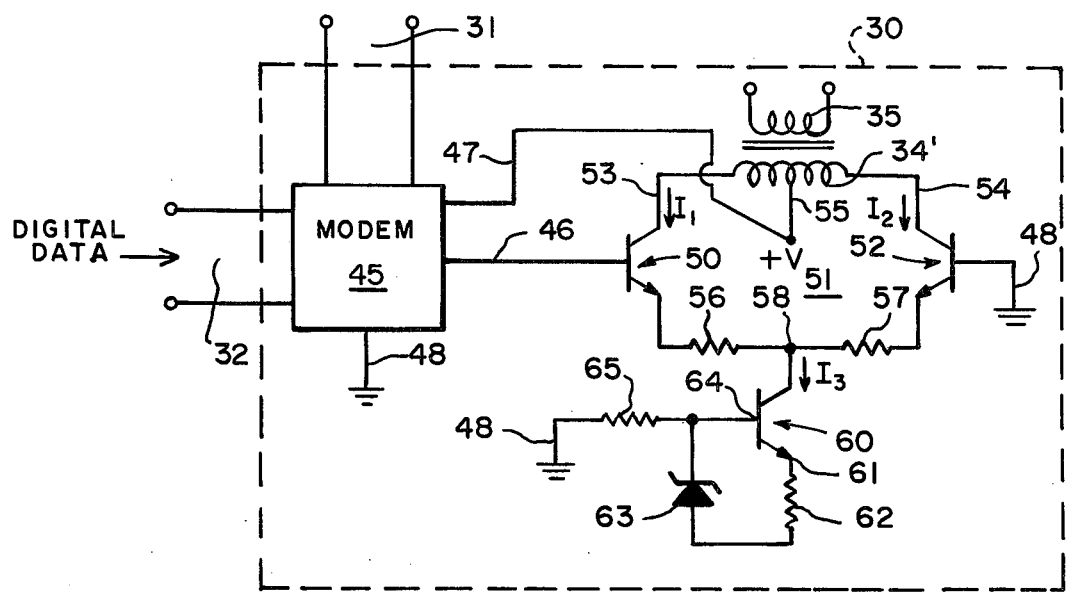
FIG. 6 is a schematic diagram of one embodiment of the current drive for a multi-drop communications device.

In FIG. 6 a detailed disclosure of one of the digital data modem means 30 is provided. The digital data modem means 30 has power supplied at 31 and has a digital data input at 32. The digital data 32 is connected to a modem 45 that is capable of converting the digital data to a voltage representative frequency that is outputted on conductor 46. To this point, the digital data modem means 30 is conventional. The modem means 45 also supplies the necessary power on conductor 47 for the balance of the circuitry.

The voltage that appears on conductor 46 is between conductor 46 and a ground 48, and drives a first transistor means 50. The transistor means 50 is connected in a differential amplifier means configuration generally disclosed at 51 and includes a second transistor means 52. Both of the transistor means 50 and 52 are connected by conductors 53 and 54 to a secondary winding 34' of the coupling transformer that has been previously disclosed. The primary winding 34' is center tapped at 55 where it is connected to conductor 47 to supply power to the differential amplifier means 51. The differential amplifier means 51 is substantially completed by connecting transistor means 50 through a resistor 56, and transistor means 52 through a resistor 57 to a common point 58. The transistor means 52 is also grounded at 48 as a common ground for the circuit.

The connection point 58 is connected through a further transistor means 60 that in turn has an emitter 61 connected through a resistor 62, a zener diode 63, and a connection back to the base 64 of the transistor means 60. The base 64 is grounded at 48 through a further resistor 65. The zener diode 63 and the resistor 64 form a bias arrangement for the transistor means 60 and create a constant current source means that is connected to the point 58. The current flow between the point 58 and the ground 48 is a constant value represented as $I_3$. $I_3$ is made up of the current flows that occur in the two transmitter means 50 and 52 and are designated as $I_1$ and $I_2$. Kirchoff's law shows that the total current flowing in $I_3$ is made up of $I_1$ plus $I_2$. Since $I_3$ is a constant current, the differential amplifier means 51 will always have a proportionate increase in current flow in one side of the differential amplifier means 51 with a decrease in the other side.

With the arrangement disclosed in the digital data means 30 of FIG. 6, it can be seen that at any time a voltage is applied driving the conductor 46 positive, that the current $I_1$ in the transistor means 50 increases. Since the current $I_3$ is a constant, the current $I_2$ in the transistor means 52 must decrease. The reverse of this current condition obviously also occurs. It is thus obvious that as a voltage appears on 46, that a current is drawn in the transformer primary 34' that is coupled to the transformer secondary 35 and which is connected to the communications channel without substantially loading the impedance of the communications channel.

Figure 7:
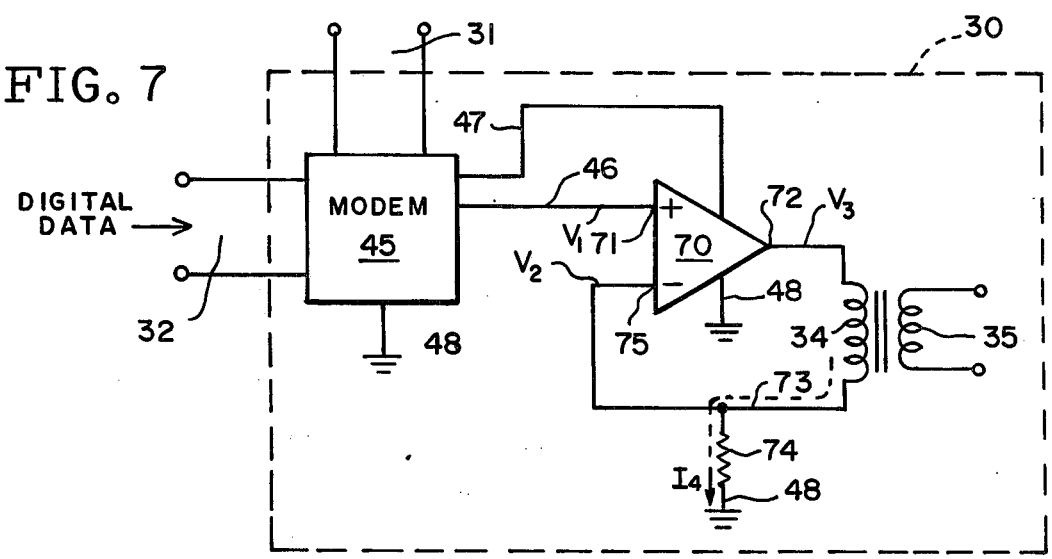
FIG. 7 is a schematic diagram of a second embodiment of a multi-drop communications device.

Another form of digital data modem means 30 is disclosed in FIG. 7. Once again, input power is supplied at 31 along with digital data at 32. Again a modem 45 that is grounded at 48 is disclosed. The modem 45 provides power for the electronics on conductor 47 and an output voltage that is representative of the digital input data 32 on conductor 46. In the digital data modem means 30 of FIG. 7 the voltage supplied on conductor 46 is connected to the non-inverting terminal 71 of an operational amplifier means generally disclosed at 70. The operational amplifier means 70 receives its energizing power between conductor 47 and the ground 48. The output of the operational amplifier means 70 is at 72 and is connected through the primary winding 34 that is coupled to the secondary winding 35 previously disclosed. The secondary winding 34 is connected by a conductor 73 to a resistor 74 to ground 48. The conductor 73 also connects back to an inverting terminal 75 of the operational amplifier means 70.

Assuming that the amplifier means 70 has a voltage gain of Av and an input impedance much higher than R (the resistance of resistor 74); that the current from the output 72 to ground 48 in resistor 74 is $I_4$; that the impedance presented by primary winding 34 is $Z_p$; and, that the voltages $V_1$, $V_2$ and $V_3$ are as shown in FIG. 7; then:

$$V_3 = Av(V_1 - V_2),$$

and $$V_3 = I_4(Z_p + R),$$

then $$Av(V_1 - V_2) = I_4(Z_p + R)$$

$$I_4 = Av\left[\frac{V_1 - V_2}{Z_p + R}\right] = \frac{AvV_1 - AvV_2}{Z_p + R}$$

and since $V_2 = I_4 R$, then $$I_4 = \frac{Av(V_1 - I_4 R)}{Z_p + R}; \text{ so } I_4\left[1 + \frac{AvR}{Z_p + R}\right] = \frac{AvV_1}{Z_p + R},$$

and therefore $$I_4 = \frac{AvV_1}{Z_p + (Av + 1)R}$$

If $AvR > Z_p$ and $Av > 1$; then it can be seen that:

$$I_4 \approx V_1/R$$

Since the current in the secondary winding 35 is a function only of the turns ratio times the primary current $I_4$, then the secondary current is only a function of $V_1$ and not of $V_3$; and hence the current is independent of the voltage on the communications channel. With the arrangement disclosed, a digital data modem means 30 has been again disclosed in a second form with a current control means that is responsive to the data conversion within the modem means, and that the current control means causes a current flow related to $I_4$ in the data transmission channel without substantially loading the impedance of that channel.

Figure 8:
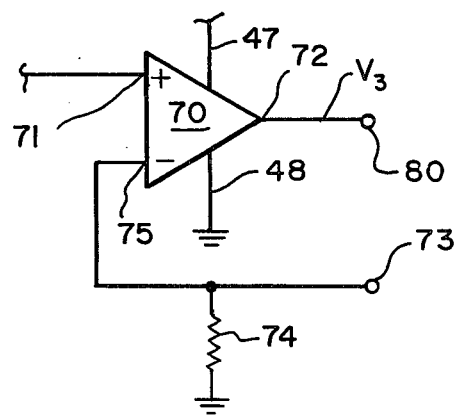
FIG. 8 is a modified schematic of part of FIG. 7.

In FIG. 8 a very highly simplified arrangement of a part of FIG. 7 is disclosed. The operational amplifier means 70 is again disclosed with the non-inverting terminal 71 and the inverting terminal 75 along with the output terminal 72. Once again the resistor 74 is disclosed, but in this case the output voltage $V_3$ is supplied on a conductor 80 and the conductor 73 without the intervention of the transformer primary 34 and the transformer secondary 35. The arrangement disclosed in FIG. 8 can be connected directly across a communications channel with the conductors 80 and 73 replacing the secondary winding 35 of the transformer that has been disclosed in the previous versions. While this arrangement does away with the transformer, the more common usage would be with a transformer to avoid any possible problems that might be encountered with interference or possible damage to the equipment by the inadvertent application of transients or stray voltages.

The arrangements disclosed are capable of being connected to and operated properly with a pair of conductors even though it should be understood that the actual values for impedance sometimes vary from the nominal characteristic impedance as a function of frequency. Test data on a pair of twisted conductors of 22 gauge size have led to the finding that the impedances of actual lines are sufficiently similar so as to provide adequate data transmission functions using the present invention.

It is quite obvious that the present invention is directed to a concept which can be implemented by a number of specific circuit configurations. For this reason, the applicant wishes to be limited in the scope of his invention solely by the appended claims.

The embodiments of the invention in which an exclusive property or right is claimed are defined as follows:

1. A multi-drop communications device adapted to be utilized with a plurality of types of communication channels, including: digital data modem means adapted to transmit digital data over a communications channel between central station means and remote station means; said communications channel having a definite characteristic impedance and being either telephone line means or a pair of conductors; said digital data modem means including digital data conversion means with said digital data being converted between frequencies and voltages representative of the digital data being transmitted; current control means responsive to said data conversion means connecting said modem means to said communications channel wherein said current control means includes current driver means that has current flows that are representative of said data representative voltages regardless of whatever load is presented to said communications channel; said current driver means including differential amplifier means having a constant current source which is common to a pair of amplifier portions of said differential amplifier means; and high impedance coupling transformer means connecting said pair of amplifier portions to said communications channel.

2. A multi-drop communications device as described in claim 1 wherein said differential amplifier means includes a pair of differentially connected transistors with said constant current source being a transistor biased by a constant voltage circuit including a zener diode.

3. A multi-drop communications device as described in claim 2 wherein said transformer means includes a tapped primary winding and an output winding with said output winding being connected to a parallel connected impedance to match said multi-drop communications device to said communications channel.

* * * * *